United States Patent
Liu et al.

(10) Patent No.: US 7,022,236 B2
(45) Date of Patent: Apr. 4, 2006

(54) MEMBRANE BIOREACTOR, PROCESS AND AERATOR

(75) Inventors: Minggang Liu, Burlington (CA); Hidayat Husain, Brampton (CA); Pierre Cote, Dundas (CA); Ian Pottinger, Burlington (CA)

(73) Assignee: ZENON Environmental Inc., Oakville (CA)

( * ) Notice: Subject to any disclaimer, the term of this patent is extended or adjusted under 35 U.S.C. 154(b) by 0 days.

(21) Appl. No.: 10/950,460

(22) Filed: Sep. 28, 2004

(65) Prior Publication Data

US 2005/0061725 A1 Mar. 24, 2005

Related U.S. Application Data

(62) Division of application No. 10/309,819, filed on Dec. 5, 2002, now Pat. No. 6,863,817.

(51) Int. Cl.
*C02F 3/00* (2006.01)
*C02F 1/74* (2006.01)
*B01F 3/04* (2006.01)

(52) U.S. Cl. .................. 210/620; 210/220; 210/221.2; 210/259; 261/124

(58) Field of Classification Search ............ 210/605, 210/614, 620, 622, 629, 631, 198.1, 205, 210/206, 220, 221.2, 252, 259, 903, 906, 210/908; 261/77, 121, 124, 121.1
See application file for complete search history.

(56) References Cited

U.S. PATENT DOCUMENTS

| 4,210,528 A | 7/1980 | Coviello et al. |
| 4,566,971 A | 1/1986 | Reimann et al. |
| RE33,177 E | 3/1990 | Schmit et al. |
| 4,923,614 A | 5/1990 | Engelbart |
| 5,232,596 A * | 8/1993 | Castaldi ............ 210/603 |
| 5,248,424 A | 9/1993 | Cote et al. |
| 5,480,553 A | 1/1996 | Yamamori et al. |
| 5,611,927 A | 3/1997 | Schmid |
| 5,639,373 A | 6/1997 | Mahendran et al. |
| 5,702,604 A | 12/1997 | Yamasaki et al. |

(Continued)

FOREIGN PATENT DOCUMENTS

DE 3318412 A1 11/1984

(Continued)

OTHER PUBLICATIONS

"Summons to Oral Proceedings", regarding European Patent application No. 99 947 155.0, dated May 27, 2003.

(Continued)

*Primary Examiner*—Fred G. Prince
(74) *Attorney, Agent, or Firm*—Bereskin & Parr (57) ABSTRACT

A reactor has an aerobic tank, an anoxic tank and a sealed membrane tank with conduits for circulating mixed liquor between them. Permeation starts when the mixed liquor reaches a high level and stops when the mixed liquor reaches a low level. A sensor, for detecting the mixed liquor level, may stop and start permeation. Pressure builds in the membrane tank when membrane air is on. Transmembrane pressure is also provided by gravity flow or siphon. Membrane air generates an air lift which drives the mixed liquor circulation. The total amount of air provided by an air source is divided and varied in time between the membrane aerator and the process aerator. The process aerator acts as a screening inlet to the conduit to the membrane tank. Chemical maintenance cleaning is provided by gravity flow.

2 Claims, 4 Drawing Sheets

U.S. PATENT DOCUMENTS

| | | | |
|---|---|---|---|
| 5,783,083 A | 7/1998 | Henshaw et al. | |
| 5,863,433 A * | 1/1999 | Behrends | 210/602 |
| 5,910,250 A | 6/1999 | Mahendran et al. | |
| 5,919,367 A | 7/1999 | Khudenko | |
| 5,922,201 A | 7/1999 | Yamamori et al. | |
| 5,944,997 A | 8/1999 | Pedersen et al. | |
| 6,042,677 A | 3/2000 | Mahendran et al. | |
| 6,086,765 A | 7/2000 | Edwards | |
| 6,193,890 B1 | 2/2001 | Pedersen et al. | |
| 6,210,580 B1 | 4/2001 | Wickins | |
| 6,245,239 B1 | 6/2001 | Cote et al. | |
| 6,280,626 B1 | 8/2001 | Miyashita et al. | |
| 6,284,135 B1 | 9/2001 | Ookata | |
| 6,319,411 B1 | 11/2001 | Cote | |
| RE37,549 E | 2/2002 | Mahendran et al. | |
| 6,361,695 B1 | 3/2002 | Husain et al. | |
| 6,406,629 B1 | 6/2002 | Husain et al. | |
| 6,475,385 B1 | 11/2002 | Boyce et al. | |
| 6,485,645 B1 | 11/2002 | Husain et al. | |
| 6,517,723 B1 | 2/2003 | Daigger et al. | |
| 6,550,747 B1 | 4/2003 | Rabie et al. | |
| 6,558,549 B1 | 5/2003 | Cote et al. | |
| 6,616,843 B1 | 9/2003 | Behmann et al. | |
| 6,692,642 B1 * | 2/2004 | Josse et al. | 210/605 |
| 6,843,470 B1 * | 1/2005 | Okajima et al. | 261/65 |
| 2001/0027951 A1 | 10/2001 | Gungerich et al. | |
| 2003/0001295 A1 * | 1/2003 | Okajima et al. | 261/124 |

FOREIGN PATENT DOCUMENTS

| | | |
|---|---|---|
| DE | 198 07 890 A1 | 8/1999 |
| EP | 0937494 | 8/1999 |
| JP | 06-057302 | 1/1985 |
| JP | 61107905 | 5/1986 |
| JP | 62-144712 | 6/1987 |
| JP | 62-250908 | 10/1987 |
| JP | 01-168304 | 7/1989 |
| JP | 4180821 | 6/1992 |
| JP | 04-250898 | 9/1992 |
| JP | 04-265128 | 9/1992 |
| JP | 08-004722 | 9/1992 |
| JP | 4256425 | 9/1992 |
| JP | 04-284888 | 10/1992 |
| JP | 2641341 | 1/1993 |
| JP | 06-071274 | 3/1994 |
| JP | 06-071275 | 3/1994 |
| JP | 06-071277 | 3/1994 |
| JP | 06-071279 | 3/1994 |
| JP | 06-079293 | 3/1994 |
| JP | 06-254582 | 9/1994 |
| JP | 06-285341 | 10/1994 |
| JP | 7100486 | 4/1995 |
| JP | 7-185270 | 7/1995 |
| JP | 07-185271 | 7/1995 |
| JP | 07-265888 | 10/1995 |
| JP | 7251042 | 10/1995 |
| JP | 07-290075 | 11/1995 |
| JP | 07-299480 | 11/1995 |
| JP | 07-299492 | 11/1995 |
| JP | 07-328680 | 12/1995 |
| JP | 07-328694 | 12/1995 |
| JP | 08-024594 | 1/1996 |
| JP | 08-047695 | 2/1996 |
| JP | 08-084995 | 4/1996 |
| JP | 8-187494 | 7/1996 |
| JP | 2904564 | 7/1996 |
| JP | 08-281284 | 10/1996 |
| JP | 08-290184 | 11/1996 |
| JP | 08-323161 | 12/1996 |
| JP | 2946072 | 12/1996 |
| JP | 09-075966 | 3/1997 |
| JP | 09-103792 | 4/1997 |
| JP | 09-108672 | 4/1997 |
| JP | 09-136092 | 5/1997 |
| JP | 09-150169 | 6/1997 |
| JP | 09-168788 | 6/1997 |
| JP | 09-220569 | 8/1997 |
| JP | 09-267097 | 10/1997 |
| JP | 09-271795 | 10/1997 |
| JP | 09-290282 | 11/1997 |
| JP | 09-299970 | 11/1997 |
| JP | 10-005782 | 1/1998 |
| JP | 10-005788 | 1/1998 |
| JP | 10-128328 | 5/1998 |
| JP | 10-128354 | 5/1998 |
| JP | 10-128355 | 5/1998 |
| JP | 10-128379 | 5/1998 |
| JP | 10-174986 | 6/1998 |
| JP | 10-263593 * | 10/1998 |
| JP | 10-290994 | 11/1998 |
| JP | 11-010186 | 1/1999 |
| JP | 11-057422 | 3/1999 |
| JP | 11-057763 | 3/1999 |
| JP | 11-057764 | 3/1999 |
| JP | 11-057765 | 3/1999 |
| JP | 11-090188 | 4/1999 |
| JP | 11-104669 | 4/1999 |
| JP | 11-104670 | 4/1999 |
| JP | 11-104674 | 4/1999 |
| JP | 11-104690 | 4/1999 |
| JP | 11-128695 | 5/1999 |
| JP | 11-169872 | 6/1999 |
| JP | 11-244877 | 9/1999 |
| JP | 11-267675 | 10/1999 |
| JP | 11-300377 | 11/1999 |
| JP | 11-309473 | 11/1999 |
| JP | 11-319511 | 11/1999 |
| JP | 11-319828 | 11/1999 |
| JP | 11-347578 | 12/1999 |
| JP | 11-347579 | 12/1999 |
| JP | 2000-000589 | 1/2000 |
| JP | 2000-005570 | 1/2000 |
| JP | 2000-042577 | 2/2000 |
| JP | 2000-042586 | 2/2000 |
| JP | 2000-070935 | 3/2000 |
| JP | 2000-117276 | 4/2000 |
| JP | 2000-140870 | 5/2000 |
| JP | 2000-167576 | 6/2000 |
| JP | 2000-218286 | 8/2000 |
| JP | 2000-237778 | 9/2000 |
| JP | 2000-271580 | 10/2000 |
| JP | 2000-271581 | 10/2000 |
| JP | 2000-271585 | 10/2000 |
| JP | 2000-279978 | 10/2000 |
| JP | 2000-288564 | 10/2000 |
| JP | 2000-288566 | 10/2000 |
| JP | 2000-301177 | 10/2000 |
| JP | 2000-301181 | 10/2000 |
| JP | 2000-308813 | 11/2000 |
| JP | 2000-325972 | 11/2000 |
| JP | 2001-000996 | 1/2001 |
| JP | 2001-038164 | 2/2001 |
| JP | 2001-038374 | 2/2001 |
| JP | P2001-286865 * | 10/2001 |
| JP | 2002-028675 | 1/2002 |
| JP | 2002-066261 | 3/2002 |
| WO | WO 97/06880 | 2/1997 |
| WO | WO 99/29630 | 6/1999 |
| WO | WO 00/21890 | 4/2000 |
| WO | WO 00/37369 | 6/2000 |
| WO | WO 01/05715 | 1/2001 |
| WO | WO 02/45833 * | 6/2002 |

OTHER PUBLICATIONS

English translation of Official Action regarding Japanese Patent Application No. 2000-575802, dated May 26, 2003.
International Preliminary Examination Report regarding International Application No. PCT/CA99/00940, dated Feb. 9, 2001.

Written Opinion regarding International Application No. PCT/CA99/00940, dated Nov. 7, 2000.
Written Opinion regarding International Application No. PCT/CA99/00940, dated Jul. 14, 2000.

* cited by examiner

MEMBRANE BIOREACTOR, PROCESS AND AERATOR

This application is a division of U.S. Ser. No. 10/309,819, filed Dec. 5, 2002 now U.S. Pat. No. 6,863,817. U.S. Ser. No. 10/309,819 is incorporated herein, in its entirety, by this reference to it.

FIELD OF THE INVENTION

This invention relates to a wastewater treatment process or apparatus, to a membrane bioreactor, to an aerator and to a method and system for treating home, multi-residential, commercial, institutional or industrial wastewater such as black or gray water.

BACKGROUND OF THE INVENTION

Currently, many small wastewater treatment systems use a septic tank, followed by a septic field for final purification and discharge. Increasingly, this method is becoming unacceptable because of the low level of treatment achieved, frequent failures and high cost of reconstruction, contamination of streams and groundwater, and the requirement for large land area to establish septic fields.

Japanese publication 2000-028675, German application DE 198 07 890 A1 and PCT publication No. WO 00/37369 describe wastewater treatment systems using membranes.

PCT Publication No. WO 00/21890 describes a cyclic aeration system.

Japanese publication JP 2002-066261 describes a device to catch fibrous foreign substances.

SUMMARY OF THE INVENTION

It is an object of the present invention or inventions to improve on the prior art. Other objects of the invention include providing a wastewater treatment process or apparatus, providing a membrane bioreactor, providing an aerator and providing a method and system for treating home, multi-residential, commercial, institutional or industrial wastewater such as black or gray water. The one or more inventions consist of combinations of one or more of the elements or steps described in this document. The summary below discusses various features of the one or more inventions that may help the reader understand the one or more inventions, but is not intended to define any invention.

In some aspects, the invention provides a reactor having an aerobic tank or zone, an anoxic tank or zone and an immersed membrane tank or zone with conduits for circulating tank water or mixed liquor from the membrane tank or zone to the anoxic tank or zone to the aerobic tank or zone and back to the membrane tank or zone. Feed enters the reactor through an inlet, into the anoxic tank or zone for example, and permeate exits the reactor from the membrane tank or zone. The permeate has lower concentrations of organic carbon, ammonia and total nitrogen than the feed. The membrane tank or zone may be a sealed or substantially sealed area while the aerobic and anoxic tanks or zones are open to atmospheric pressure. An optional quiescent zone may be provided in an anoxic tank or zone to settle and collect a potion of suspended matter. The anoxic tank or zone or the quiescent zone may have sufficient capacity such that settled solids needs to be removed only once a year or less from the system. A coagulant may be added for chemical precipitation of phosphorus.

In other aspects, the invention provides a reactor having one or more process tanks or zones for one or more of aerobic digestion, nitrification or denitrification and a membrane tank or zone. Mixed liquor circulates between the membrane tank or zone and the process tanks or zones. Permeate is removed from the membrane tank or zone when the level of mixed liquor in the one or more tanks or zones reaches a selected maximum mixed liquor level and stops when the level of mixed liquor in the one or more tanks or zones reaches a selected minimum mixed liquor level. A level sensor may be provided for detecting the selected maximum mixed liquor level and the selected minimum mixed liquor level in one of the one or more process tanks or zones. The level sensor may be operatively connected to devices for one or more of (a) stopping and starting permeation, (b) increasing and decreasing the total air supply provided by an air supply or (c) altering a regime of cyclic aeration. Isolation valves may be provided in the conduits or passages to permit the membrane tank to be removed from the one or more process tanks or zones.

In other aspects, the invention provides one or more membrane modules located in a membrane tank or zone and an aerator for aerating the one or more membranes or membrane modules at least from time to time. The membrane tank or zone is sealed or substantially sealed such that pressure in the membrane zone or tank increases during at least a portion of a time during which the aerator is operated even though the mixed liquor in the membrane tank or zone becomes less dense. Permeate flow rate increases when pressure in the membrane tank or zone increases. Transmembrane pressure for withdrawing permeate may also be provided by a gravity flow outlet or siphon connected to a permeate side of the one or more membrane modules. The membrane aerator may also be used to generate an air lift effect which facilitates mixed liquor flowing into the membrane tank or zone through an inlet and flowing out of the membrane tank or zone through an outlet. The inlet and outlet may be connected to one or more process tanks or zones.

In other aspects, the invention provides a reactor having one or more process tanks or zones, a membrane tank or zone, one or more membrane aerators for producing bubbles in the membrane tank or zone, one or more process aerators for producing bubbles in one of the one or more process tanks or zones and an air source connected to the one or more membrane aerators. The air source is connected to the one or more process aerators and the one or more membrane aerators and the total amount of air provided by the air source is divided between the membrane aerator(s) and the process aerator(s). The amount of air provided by the air source to the one or more process aerators may vary in time and the amount of air provided by the air source to the one or more membrane aerators may vary in time.

In other aspects, the invention provides an aerator having an aerator body with holes for releasing bubbles from the aerator body or for allowing mixed liquor surrounding the aerator to enter the aerator body. During at least some first periods of time, air enters the aerator body through an inlet to produce bubbles. During at least some time, which may be different than the first periods of time, mixed liquor flows into the aerator body through the holes and exits the aerator body through an outlet. The outlet may be connected to a mixed liquor conduit for removing mixed liquor from a tank or zone containing the aerator. The inlet may be connected to an aeration system which provides an airflow sufficient to create bubbles from at least some of the holes at some times and which allows mixed liquor to flow into the holes during at least some times.

In other aspects, the invention is related to an aeration system having one or more process aerators, one or more membrane aerators and an air supply. A process air line provides a path for air from the air supply to the one or more process aerators and a membrane air line provides a path for air from the air supply to the one or more membrane aerators. A valve is provided in one of the process air line or the membrane air line, the valve having a first position in which it is fully or partially open and a second position in which it is fully or partially closed. When the valve is in the first position, at least a major portion of the air provided by the air supply flows to the one or more aerators serviced by the air line having the valve, and when the valve is closed, at least a major portion of the air provided by the air supply flows to the other one or more aerators serviced by the other air line. For example, the one or more aerators serviced by the air line having the valve may be located to a lesser depth in water compared to the one or more aerators serviced by the other air line. The valve may be controlled by a valve controller which changes the valve from the first position to the second position and back to the first position in repeated cycles, for example, repeated cycles between 10 and 40 seconds long. The air supply may also be adapted to provide at least a higher flow rate of air and a lower flow rate of air. Air from the air supply may be provided at the higher rate of flow whenever the level of mixed liquor is above a high level, the high level related to the need for the higher rate of flow to meet process air requirements, or during permeation. The distribution of air in quantity or time between process air and membrane air may be altered from time to time to maintain acceptable process oxygen concentrations in the one or more process tanks or zones.

In other aspects of the invention, air provided to scour membranes in a membrane tank or zone also removes solids from the membrane tank or zone, or also provides biomass recirculation, for example from the membrane tank or zone to an anoxic tank or zone, to an aerobic tank or zone and back to the back to the membrane tank or zone to facilitate nitrification and denitrification.

In other aspects of the invention, a wastewater level sensor and/or a timer are used to control aspects of a process, for example by changing how air from a blower is split between process aerators and membrane aerators.

In other aspects of the invention, a plurality of blowers are provided and one or more but not all of the blowers are turned off, for example by a timer, during periods of low influent flow.

In other aspects of the invention, chemical cleaning is provided by a backwashing flow of a chemical cleaning solution provided, for example, by gravity, followed by a period in which permeate is not withdrawn. The frequency of chemical cleaning may depend on the specific application and is determined by the rate of fouling.

BRIEF DESCRIPTION OF THE DRAWINGS

Exemplary embodiments or one or more inventions will be described below with reference to the following Figures.

DETAILED DESCRIPTION OF EMBODIMENTS

Basic Configuration

Figure 1:
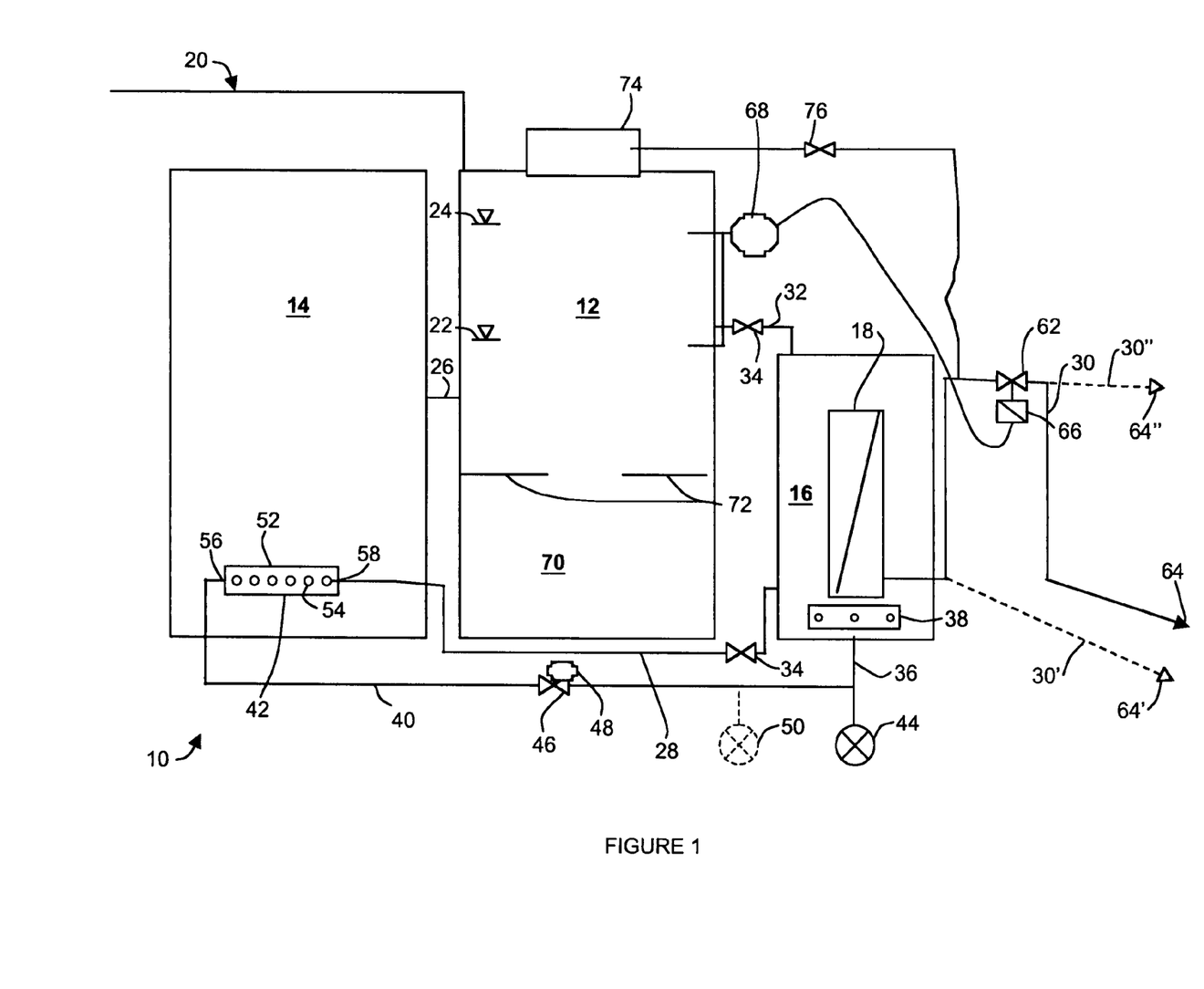
FIG. 1 is a schematic representation of a system.

FIG. 1 shows a reactor 10 for treating wastewater. The reactor 10 has an anoxic tank 12, an aerobic tank 14 and a membrane tank 16 containing a membrane module 18 or multiple membrane modules. The membrane tank 16 is sealed such that the only openings to it are through the pipes to be described below. The anoxic tank 12 and aerobic tank 14 are open to atmospheric pressure although they may be covered to prevent unwanted matter from falling into them. A feed line 20 transports influent or feed water to the reactor 10, for example to the anoxic tank 12. During regular operation, the reactor 10 is filled with mixed liquor to a level between a minimum mixed liquor level 22 and a maximum mixed liquor level 24. The minimum mixed liquor level 22 is above the tops of the membrane module 18 and, typically, also above the top of the membrane tank 16.

An anoxic line 26 provides a conduit below the minimum mixed liquor level 22 for anoxic mixed liquor and influent to flow from the anoxic tank 12 to the aerobic tank 14. An aerobic line 28 provides a conduit below the minimum mixed liquor level 22 for aerobic mixed liquor to flow from the aerobic tank 14 to the membrane tank 16. A permeate line 30 provides a conduit for permeate to exit the reactor 10 from the permeate side of the membrane module 18. A retentate return line 32 provides a path for mixed liquor or mixed liquor and air bubbles to flow from the membrane tank 18 to the anoxic tank 12. During normal operation, mixed liquor circulates repeatedly through the anoxic tank 12, aerobic tank 14 and membrane tank 16 to provide alternating aerobic and anoxic digestion. This facilitates alternating nitrification and denitrification of the mixed liquor. The membrane module 18 provides filtration. The resulting permeate has reduced concentrations of solids, organic carbon, ammonia and total nitrogen.

If substantial reduction of nitrate and total nitrogen is not required, the anoxic tank 12 may be omitted with corresponding alterations. For example, the feed line 20 is connected to the aerobic tank 14, the anoxic line 26 is omitted and the retentate return line 32 is connected to the aerobic tank 14. Other alterations relating to further features described below may also be required. Without an anoxic tank, mixed liquor circulates between the aerobic tank 14 and the membrane tank 16 to provide aerobic digestion and filtration. A modified or retrofitted septic tank may be used as the aerobic tank 14. Similarly, if phosphorous removal is desired, additional tanks or other devices may be provided as described, for example, in U.S. Pat. No. 6,406,629 issued Jun. 18, 2002 to Husain et al. The entire disclosure of U.S. Pat. No. 6,406,629 is incorporated into this document by this reference to it.

Although distinct tanks are shown in FIG. 1 and have been discussed above, the one or more inventions may be practiced with a single tank divided into one or more aerobic, anoxic or membrane zones, or with other numbers of tanks or zones. For example, the membrane tank 16 and aerobic tank 14 may be merged by placing the membrane module 18 in a part or zone of the aerobic tank 14 separated by appropriate baffles, walls or shrouding and provided with a modified air lift configuration. The anoxic tank 12 and aerobic tank 14 may similarly be merged into a single tank having anoxic and aerobic zones.

Removable Membrane Tank

The retentate return line 32 and aerobic line 28 may be fitted with isolation valves 34. With the isolation valves 34 closed, the membrane tank 16 becomes a completely sealed unit. The membrane tank 16 may be removed from the reactor 10 for maintenance, repair or replacement without disturbing the anoxic tank 12 or aerobic tank 14. The membrane module 18 can also be removed to a remote location for maintenance, repair or replacement without removing it from the mixed liquor at the site of the reactor 10 to reduce the odors and risk of spills at the site of the reactor 10.

For example, the membrane module 18 will have a longer life if it is intensively recovery cleaned from time to time, for example once a year. A service provider may maintain a number of membrane modules 18 in membrane tanks 16 in stock or inventory. When a first user's membrane module 18 requires recovery cleaning or other maintenance, repair or replacement, the service provider removes the customer's existing membrane tank 16 and membrane module 18 and replaces them with clean replacements. The removed units are taken back to the service provider's facilities, cleaned and returned to inventory for later delivery to the first or another user.

Aeration

Membrane air, meaning air for the purpose of providing bubbles to inhibit fouling of the membranes, enters the membrane tank 16 through a membrane air line 36. The membrane air line 36 carries the air (or other gases used for the same purpose) to one or more membrane aerators 38. Bubbles are formed at the membrane aerator 38 and rise past or through the membrane module 18 to inhibit fouling or clean the membranes. Holes in the membrane aerator 12 may be made to produce large bubbles that are effective at reducing fouling of the membranes.

Process air, meaning air to keep the mixed liquor in the aerobic tank 14 under aerobic conditions, is provided to the aerobic tank 14 through a process air line 40. The process air line 40 brings air (or other suitable gases) to a process aerator 42. The process aerator 42 may have smaller holes to produce smaller bubbles than the membrane aerator 38 does for efficient oxygen transfer to the aerobic mixed liquor. In the exemplary embodiment, however, the process aerator 42 has the same hole size as the membrane aerator 38 and is a coarse bubble aerator.

Both the membrane air line 36 and the process air line 40 may be connected to the same blower 44 or other source of pressurized air or other suitable gas. The supply of air from the blower may further be cycled between the membrane aerator 38 and the process aerator 42, for example, by using a cyclic aeration system as described in U.S. Pat. No. 6,245,239 issued on Jun. 12, 2001 to Cote et al. The entire contents of U.S. Pat. No. 6,245,239 are incorporated into this document by this reference to it.

The exemplary embodiment of FIG. 1 uses other means to transfer all, substantially all or a major portion of the air provided by the blower 44 first to one of the aerators 38, 42 and then to the other of the aerators 38, 42 in repeated cycles. One of the aerators 38, 42 is located at an elevation sufficiently above the other aerator 38, 42 such that, with the membrane air line 36 and process air line 40 both open, a major portion, substantially all or all of the air provided by the blower 44 flows through the higher of the aerators 38, 42. Differences in factors that create head losses associated with flow to and through either of the aerators 38, 42 may also be used to achieve the same or a similar effect. An air valve 46 is provided in the air line 36, 40 leading to the higher of the aerators 38, 42 or the one which has higher air flow if both air lines 36, 40 are open. The air valve 46 may be closed partially or fully such that a major portion, substantially all or all of the air provided by the blower 44 then flows through the other of the aerators 38, 42. For example, the process aerator 42 may be located above the elevation of the membrane aerator 38 and the air valve 46 provided in the process air line 40. The relative elevations of the aerators 38, 42 and the head losses involved in flowing air to and through the aerators 38, 42 are such that, with the air valve 46 fully open, 90% or more of the air provided by the blower 44 flows through the process aerator 42. From time to time, the air valve 46 is fully, or substantially fully, closed and all, or substantially all, for example 90% or more, of the air from the blower 44 then flows to the membrane aerator 38.

The air valve 46 may be operated automatically by an air valve controller 48. For example, the air valve controller 48 may use a solenoid or hydraulic or pneumatic piston connected to the air valve 46. The air valve controller 48 may also incorporate a timer or programmable logic controller to provide a repeated aeration cycle. In the exemplary embodiment, a timer is used in the air valve controller 48 and reverses the position of the air valve 46 (i.e. opens the air valve 46 if it is closed, and closes the air valve 46 if it is open) at the end of every time period of a preset duration. The time period may be, for example, between 5 and 20 seconds for a total cycle time between 10 and 40 seconds. In the exemplary embodiment, the time period ranged between 7 seconds and 10 seconds and the total cycle time ranged between 14 seconds and 20 seconds. The air valve 46 is closed abruptly to produce a pressure spike in the membrane aerator 38 and an initial rush of large bubbles. Such an initial rush of large bubbles appears to effectively inhibit fouling of the membrane module 18. The time varying supply of membrane air also creates transience in the membrane tank 16 that further inhibits fouling of the membrane module 18.

Optionally, other distributions of air, in time and flow rate, can be provided. For example, a larger portion of the air may be provided to either of the aerators 38, 42. With sufficiently small holes in the process aerator 42, oxygen transfer efficiency may be sufficient to allow air to be provided to the membrane aerator 38 for more than half of every aeration cycle. If a fine bubble aerator is used in the aerobic tank, a regulating or manual valve may be added to the membrane air line 36, or the air valve 46 may be moved to the membrane air line 36 and the membrane aerator 38 located below the process aerator 42, to ensure that a larger portion of the air flow can be provided to the process aerator 42 during part of the cycle without requiring an excessive difference in elevation between the aerators 38, 42. In contrast, particularly during periods of high feed flow, the cycle may also be changed to increase the duration or amount of airflow to the process aerator 42 relative to the membrane aerator 38 if required to maintain an appropriate dissolved oxygen concentration in the aerobic tank 14. During periods of low feed flow, the cycle may be changed again to increase the duration or amount of airflow to the membrane aerator 38 relative to the process aerator 42 to provide membrane cleaning while keeping the dissolved oxygen concentrations in the anoxic tank 12 low enough for adequate denitrification.

In the exemplary embodiment, a single blower 44 is used and it is run at a substantially constant speed over extended periods of time. Optionally, a two speed or variable speed blower may also be provided and operated so that a higher total supply of air is increased during permeation and a lower total supply of air is provided when permeate is not produced. While providing a higher total amount of air, the aeration cycle may also be modified so that the bulk of the increased air is provided to the membrane aerator 38 or so that the dissolved oxygen content in the aerobic tank 14 is not increased to an undesirable or unnecessary level. The higher blower speed may also be used when the level of mixed liquor in the reactor 10 is high. In this case, the aeration cycle may be modified to favor the process aerator 42 to provide sufficient air to maintain aerobic conditions in the aerobic tank 14. Further optionally, a second blower 50 may be used, the two blowers 44, 50 being sized so that they together have enough output to meet the expected maximum air requirements of the reactor 10. At high levels of mixed liquor in the reactor 10 or while permeating, both blowers 44, 50 are run. While the level of mixed liquor is low or while not permeating, only one of the blowers 44, 50 is used to reduce energy consumption and help keep the anoxic zone at an acceptable oxygen concentration. The aeration cycles may also be suitably modified depending on which of the blowers 44, 50 is running and whether permeate is being produced or not. If it is desired at some point to have a low supply of membrane air while permeating, membrane permeability may be recovered by providing additional membrane air after permeating. If only one single speed blower 44 or another invariable source or air is used, the aeration cycle may be biased in time or flow rate towards process air when the mixed liquor level is high to meet the elevated oxygen demand. The aeration cycle may also be biased in time or flow rate towards membrane air when the mixed liquor level is low to reduce process aeration as required to maintain anoxic conditions in the anoxic tank 12 despite a lower organic loading and to recover membrane permeability prior to the next significant permeation cycle.

Aerator/Inlet

As shown in FIG. 1, mixed liquor enters the aerobic line 28 through the process aerator 42. The process aerator 42 of the exemplary embodiment is also shown in greater detail in FIG. 3. The process aerator 42 has an aerator body 52 pierced with a number of aerator holes 54. The holes 54 may be of a various sizes, for example 0.25 inches in the exemplary embodiment. When process air is provided, air enters the process aerator 42 from the process air line 40 through an air inlet 56, flows through the aerator body 52 and bubbles are produced at the aerator holes 54. When process air is not provided at a sufficient flow rate to produce bubbles at all of the aerator holes 54, mixed liquor flows through some or all of the aerator holes 54 into the aerator body 52. The mixed liquor then flows through a mixed liquor outlet 58 and through the aerobic line 28 to the membrane tank 16.

Figure 3:
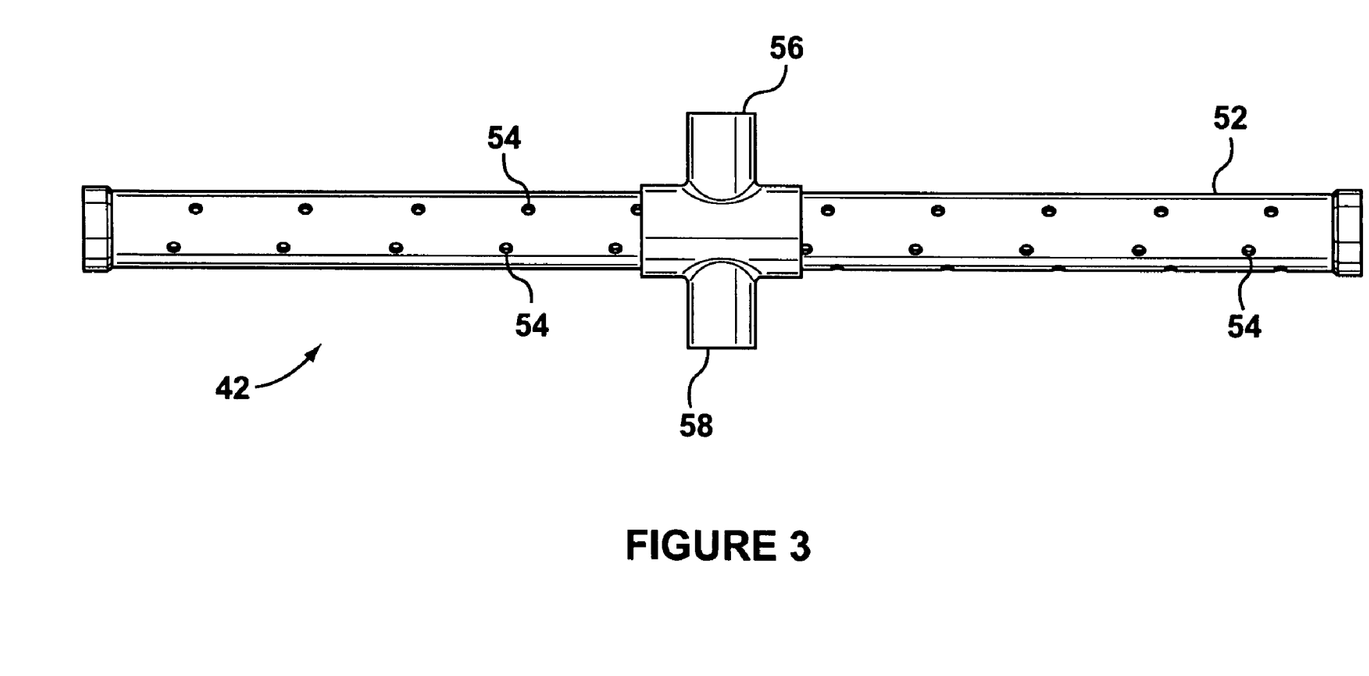
FIG. 3 is a schematic representation of an aerator/inlet.

As the air flow to the process aerator 42 is varied as was described further above, the process aerator alternately acts as an aerator and as a screening inlet for the aerobic line 28. As a screening inlet, the process aerator 42 reduces the amount of solids, particularly trash, hair and other stringy elements, that flow to the membrane tank 16. Such trash and stringy elements can cause the membrane module 18 to foul quickly. When air flow to the process aerator 42 is high, the bubbles created blow the trash and other elements away from the aerator holes 54. When air flow to the process aerator 42 is low, liquid mixed liquor flows through the aerator holes 54 which inhibits the growth of dried sludge deposits in the holes. Accordingly, cleaning is provided for the process aerator 42 both as an aerator and as a screened inlet.

Mixed Liquor Circulation

Circulation of the mixed liquor is provided by the membrane air which creates an air lift effect in the membrane tank 16. With membrane air on, bubbles of air travel from the top of the membrane tank 16 into and through the retentate return line 32 carrying entrained mixed liquor into the anoxic tank 12. The density of the mixed liquor in the membrane tank 16 is also reduced, causing mixed liquor from the aerobic tank 14 to be drawn into the membrane tank 16 while mixed liquor from the membrane tank 16 travels to the anoxic tank 12. The level of mixed liquor in the anoxic tank 12 is made slightly higher than the level of mixed liquor in the aerobic tank 14 and so mixed liquor flows by gravity from the anoxic tank 12 to the aerobic tank 14 to complete the recirculation loop. In this way, the membrane air is used to circulate mixed liquor through the reactor 10. However, because the membrane tank 16 is sealed, or at least substantially sealed, pressure in the membrane tank 16 is higher than would be expected considering the reduced density of the mixed liquor in the membrane tank 16 alone. The added pressure caused by the membrane air works against the circulation of mixed liquor. This is acceptable, or even desirable, since the membrane air might otherwise cause too much circulation and the amount of pressure created due to membrane air can be controlled by altering the amount of membrane air relative to the size, position and length of the retentate return line 32. In this way, an acceptable circulation flow rate and desired membrane air flow rate can both be achieved.

With cyclic aeration as described above, the air lift is alternately created and dissipated and the comments in the paragraph above refer to average conditions over time. In the exemplary embodiment, for example, a new air lift is begun every 14 to 20 seconds and lasts for about 7 to 10 seconds. Accordingly, the rate of mixed liquor circulation fluctuates. In particular, when the membrane air is first turned on, or the flow rate of membrane air is suddenly increased, there is a rush of large bubbles that cause a burst of mixed liquor flow into the anoxic tank 12. The flow rate of the mixed liquor to the anoxic tank 12 decreases after this initial burst. When membrane air is turned off, or its flow rate significantly decreased, the mixed liquor flow rate in the anoxic tank 12 again decreases. Towards the end of a period of low or no membrane air, the mixed liquor flow may cease or temporarily reverse with some mixed liquor flowing back from the anoxic tank 12. The net flow, however, remains positive towards the anoxic tank 12. The bubbles entering the anoxic tank 12 cause some oxygen transfer to the anoxic mixed liquor but, since they are large scrubbing bubbles and enter part way up the anoxic tank 12, conditions in the anoxic tank 12 remain anoxic. Flows from the aerobic tank 14 to the membrane tank 16 also vary. It is possible for a slight reverse flow to occur back to the aerobic tank 14 at the end of a period when membrane air is provided, but net flow remains towards the membrane tank 16. As mentioned above, an excess of flow back towards the aerobic tank 14 can be cured by altering the retentate return line 32 so that less pressure is created in the membrane tank 16 by the membrane air. In the exemplary embodiment, the retentate return line 32 was configured so that there was no back flow from the membrane tank 16 to the aerobic tank 14 at any time during the aeration cycle.

Figure 2:
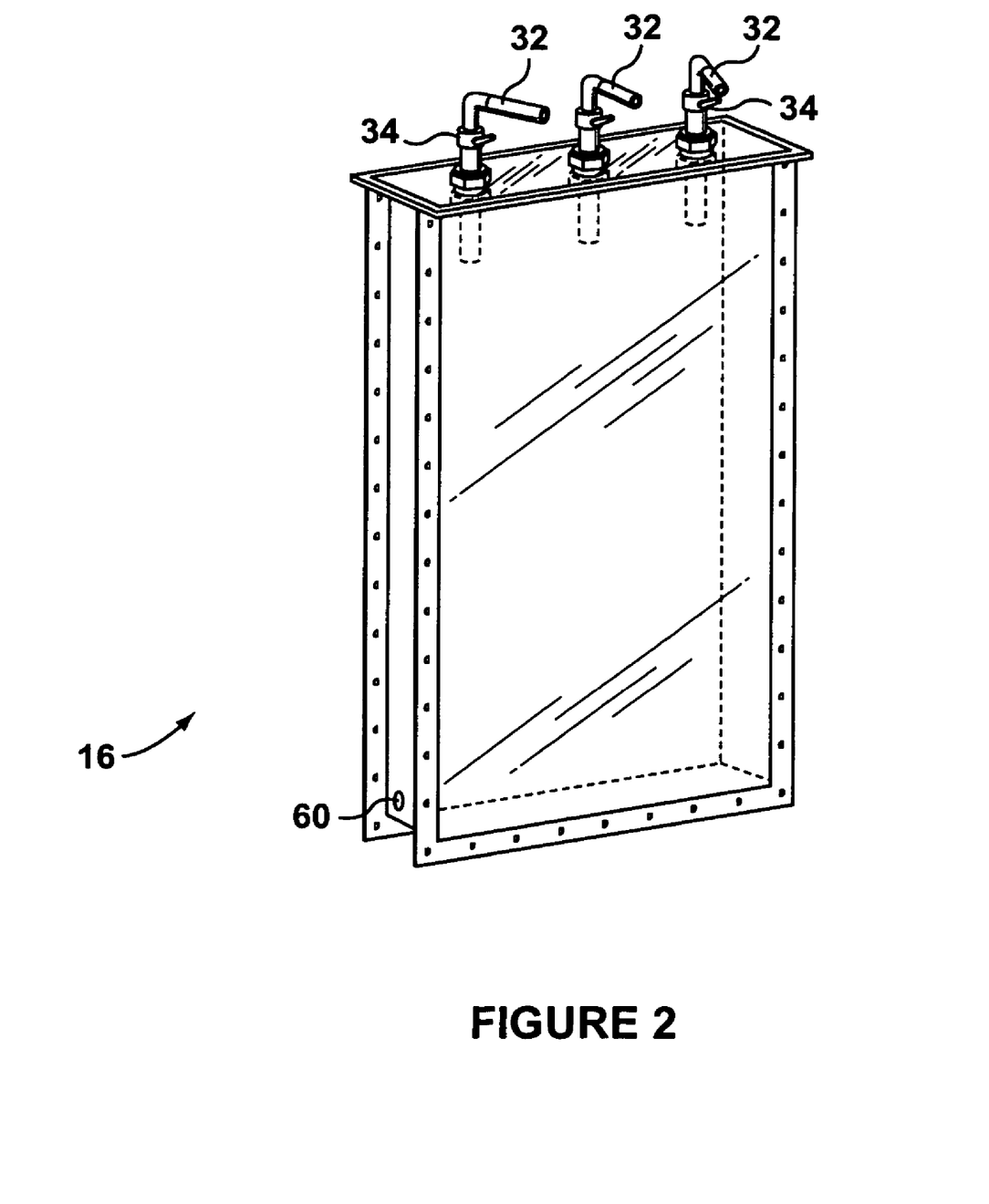
FIG. 2 is an isometric view of a membrane tank of the system of FIG. 1.

The membrane tank 16 and the retentate return line 32 are sized and configured so that the mixed liquor flow will be adequate for the process and feed loading considering the aeration regime that will be used. For example, FIG. 2 shows the membrane tank 16 of the exemplary embodiment in greater detail. The interior of the membrane tank 16 is about 1300 mm high, 200 mm deep and 760 mm wide. The retentate return line 32 is made of three 1" diameter pipes, each with its own isolation valve 34, projecting upwards through the top of the membrane tank 16. The membrane tank 16 is located adjacent the anoxic tank 12 so that only a short retentate return line 32 is required and the retentate return line 32 lies close to the top of the membrane tank 16. A mixed liquor inlet 60 is located near the bottom of the membrane tank 16. A single membrane module 18 is mounted inside of the membrane tank 16. The membrane module is about 730 mm long, 50 mm deep and 900 mm high and contains hollow fibres with a total surface area of 9.8 square meters suspended between top and bottom headers. The membrane aerator 38 consists of an array of pipes mounted below the membrane module 18 to provide lines of air holes distributed across the footprint of the membrane module 18. Other dimensions or configurations may be appropriate for other reactors.

Permeation

Transmembrane pressure for the membrane module 18 is created by pressure in the membrane tank 16 resulting from the head of mixed liquor, as modified by the membrane air, or suction applied to the permeate side of the membrane module 18 or both. Suction may be provided by a pump, by gravity induced flow or by a siphon. For a siphon, the permeate line 30 or alternate permeate line 30" are used. For gravity induced flow, the second alternate permeate line 30' is used. A permeate valve 62 is provided in the permeate line 30, 30', 30" and is opened to begin permeation. A permeate outlet 64, 64', 64" and all points in the permeate line 30, 30', 30" may be located below the minimum mixed liquor level 22, such that gravity will induce the flow of permeate through the permeate line 30, 30', 30". Comparing the three configurations shown in FIG. 1, permeate lines 30 and 30' create the largest transmembrane pressure but have permeate outlets 64, 64' near or below the bottom of the reactor 10 which may not be possible in all locations unless the permeate lines 30, 30' can discharge into a hole serviced by a sump pump. To prevent exposing the membranes to air in the event of a temporary power failure, the valve 62 may be a normally closed valve, for example a valve that is spring loaded to close when power is not supplied to it. In the exemplary embodiment, ¾" diameter permeate line 30 is used and the highest point in the permeate line 30 is above the top of the membrane tank 16 but below the minimum mixed liquor level 22.

The permeate valve 62 is connected to a permeate valve controller 66, such as a solenoid, which opens the permeate valve 62 to start permeation and closes it to stop permeation. In the exemplary embodiment, the permeate valve controller 66 is linked to a level sensor 68 which senses when the mixed liquor level is at the maximum mixed liquor level 24 or minimum mixed liquor level 22. The level sensor 68 communicates with the permeate valve controller 66 such that the permeate valve 62 is opened when the mixed liquor reaches the maximum mixed liquor level 24 and stops when the mixed liquor reaches the minimum mixed liquor level 22. The level sensor 68 may also communicate with the blower 44, second blower 50 or air valve 46 and may be made capable of sensing other levels of mixed liquor to provide the various cyclic aeration regimes described further above.

Membrane air reduces the density of the mixed liquor in the membrane tank 16 but, because the membrane tank 16 is sealed or substantially so, pressure in the membrane tank 16 and transmembrane pressure are higher than would be predicted based on the density of the mixed liquor alone which boosts the permeate flow rate. This boost may be provided even when a cyclic aeration regime is used as described above although the size of the boost varies in time and may at times be negligible or non-existent. To enhance the pressure created in the membrane tank 16, the retentate return line 32 is made small enough to partially restrict the flow air and mixed liquor flow through it. In the exemplary embodiment, the retentate return line 32 also projects downwards from the top of the membrane tank 16 by about 2" which causes a layer of compressed air to form at the top of the membrane tank towards the end of a period during which membrane air is provided. In the exemplary embodiment, a pressure of about 15.3 kPag develops at the bottom of the membrane tank 16 during approximately the last half of the period when membrane air is provided, i.e. for about 5 or 6 seconds out of every 20 second aeration cycle. This approaches, but does not exceed, the pressure at the bottom of aerobic tank 14 which is about 15.8 kPag. During the part of the cycle when membrane air is off, the air and mixed liquor separate to some extent causing the mixed liquor level to drop and leaving an air space at the top of the membrane tank 16. Mixed liquor flows into the membrane tank 16, primarily from the aerobic tank 14. The size, length and location of the aerobic line 28 relative to the length of time that membrane air is off, and other aspects of the system, prevent the membrane tank 16 and aerobic tank 14 from equilibrating in pressure. As a result, in the exemplary embodiment, the pressure in the membrane tank 16 when membrane air is off is about 11.9 kPag. The elevation of the permeate outlet 64 was located so that, even at this minimum pressure in the membrane tank 16, permeate flow was still appreciable at about 0.37 gpm. However, permeate flow rate with membrane air on was significantly higher at about 0.52 gpm.

If pressure build up in the membrane tank 16 is used to boost permeation, its use must be balanced with the role of the air in circulating mixed liquor. In particular, an elevated pressure in the membrane tank 16 inhibits mixed liquor flow from the aerobic tank 14. As mentioned above, when a cyclic aeration regime is used, there may even be momentary reverse flows of mixed liquor back into the aerobic tank 14 but the net circulation is still made positive in the direction from the aerobic tank 14 to the membrane tank 16 to the anoxic tank 12.

Process

In the exemplary embodiment, the feed or influent is introduced to the anoxic tank 12. The influent may be residential, commercial or industrial black or gray water and may be taken directly from the buildings where it is produced. Alternately, the feed line 20 may be connected to the outlet of a septic tank or other tank which may reduce the time rate of change of the influent flow rate, provide solids settling and storage or some preliminary digestion. Alternately, to meet the requirements of variable feed flows, for example from a home, sufficient storage may be provided in the anoxic tank 12 and aerobic tank 14 to provide capacity for peak flows, for example morning and evening peak flows in a typical home. Permeation may occur only during or directly after high flow periods, and may begin when the mixed liquor level in the reactor 10 reaches the maximum mixed liquor level 24.

The anoxic tank 12 may have a total residence time of between 30 minutes and 4 hours. Large solids in the influent settle to a quiescent zone 70 at the bottom of the anoxic tank 12. Optional baffles 72 may be used to encourage settling in the quiescent zone 70. In the anoxic tank 12, the feed mixes with the recycled mixed liquor from the membrane tank 16.

Biological denitrification occurs in this tank, converting excess nitrates in the mixed liquor, using the organic matter in the raw feed as the electron receptor. Nitrogen gas thus formed is volatilized and removed with the off-gases. The denitrified feed and mixed liquor mixture then flows to the aerobic bioreactor, where biodegradable organic matter is digested, and ammonia is oxidized to nitrates. From the aerobic tank 14, the mixed liquor is recycled through the membrane tank 16 and then to the anoxic tank 12. About a 5:1 recirculation to feed ratio may be provided for effective denitrification. The concentration of dissolved oxygen in the anoxic tank 12 is kept generally low, for example at 0.5 mg/l or less, at most times and some or all of the mixed liquor in the anoxic tank 12 may be essentially anaerobic at times. The concentration of dissolved oxygen in the aerobic tank 14 is kept above about 1 mg/L at most times.

Optionally, a coagulant, such as alum, may be added to the anoxic tank 12 to precipitate soluble phosphates to reduce phosphorus discharge. The colloidal precipitated phosphorus is filtered out by the membrane which results in high removal efficiency. Excess precipitate is settled out in the anoxic tank 12 quiescent zone 70 and removed with the sludge which is pumped out from time to time in any event. Coagulant dose may be added in batch to the anoxic tank when the maximum mixed liquor level 24 is reached and permeation starts. Alternatively, coagulant can be added at a constant rate throughout permeation. In either process, the level sensor 68 may be linked to a coagulant dosing device to provide the desired coagulant dosing.

Further optionally, the reactor 10 may be run at high mixed liquor solids concentration up to 30 000 mg/L. High mixed liquor concentration may be built up by not wasting sludge. This requires a membrane module 18 with high solids tolerance such as a module of coarse hollow fibres with low packing density. A high mixed liquor solids concentration permits better nutrient removal and increases the interval between pumping out of waste sludge from the reactor 10. This is desirable in many applications, for example home treatment systems, since sludge disposal is an expense and inconvenience. High mixed liquor solids concentration also facilitates rapid establishment of anoxic conditions for improved denitrification.

Chemical Cleaning

Chemical cleaning is provided by feeding a cleaning solution, such as sodium hypochlorite, from a chemical tank 74. The chemical tank may be located so that the cleaning solution can flow to the membrane module 18 by gravity. For example, in the exemplary embodiment the chemical tank 74 is located on top of the anoxic tank 12. A chemical valve 76 starts and stops the flow of cleaning solution. Aeration is stopped while the chemical valve 76 is open to allow reduce dissipation of the cleaning solution in the membrane tank. In the exemplary embodiment, the chemical cleaning process is performed manually by opening the chemical valve 76 and turning off the air blower 44 for the duration of the cleaning event, followed by 10–60 minutes of membrane relaxation wherein no permeate is withdrawn. Chemical cleaning may be required from once a year to twice a month with a sodium hypochlorite solution of 200–500 mg/L. Optionally, chemical cleaning can be controlled automatically by a controller, for example a timer, linked to one or more of the permeate valve 62, chemical valve 76, blower 44, optional second blower 50 or air valve controller 48.

EXAMPLES

Example 1

Steady-state Operation at 1.2 $m^3$/d

A pilot system was built and operated as described for the exemplary embodiment. The pilot system was run for two weeks with a steady state feed of 1.2 cubic meters per day of municipal sewage. The pilot system had an anoxic tank and an aerobic tank, each of 800 L volume at depth of 1.8 m in those tanks, and a 200 L membrane tank. The bottom of each of the anoxic tank and aerobic tank were 0.5 meters above the bottom of the membrane tank. The system was operated at a generally constant mixed liquor depth of about 1.5 meters above the bottom of the membrane tank. At this depth, the system had a total liquid volume of about 1080 L. Flow rate in the membrane air line was 8.5 cubic meters at standard conditions per hour when air flows to the membranes. A single blower provided a continuous air flow and the entire air flow was switched between the aerobic tank and membrane tank every 7 seconds so that the rate of air flow in each of the aerobic tanks and membrane tanks was turned on for 7 seconds and off for 7 seconds in repeated cycles. The membrane module had 135 square feet of surface area. The aerobic line 28 was 1.5" in diameter.

The raw sewage was characterized as: COD of 560 mg/L, TSS of 330 mg/L, NH3-N of 23.3 mg/L and TP of 16.3 mg/L, in average. The system was operated at a temperature of 20.5° C. and a MLSS concentration of 12 g/L.

Below are the concentrations of various chemicals in the permeate, demonstrating a very high level of treatment:

| | |
|---|---|
| Permeate COD | 7.7 mg/L (98.6% removal) |
| Permeate NH3-N | 0.3 mg/L (98.7% removal) |
| Permeate NO3-N: | 7.3 mg/L |
| Permeate TP | 0.6 mg/L (96.3% removal) |

Membrane performance and oxygen transfer results were as follows, demonstrating that the aeration system was able to maintain adequate oxygen for treatment in each tank, and that the membrane module maintained acceptable permeability and productivity.

| | |
|---|---|
| Permeate flux | 13.7 L/$m^2$/h |
| Permeate turbidity: | 0.35 NTU |
| Membrane permeability: | 137 L/$m^2$/h/bar |
| DO in aerobic tank: | 2.68 mg/L |
| DO in anoxic tank: | <0.3 mg/L |
| Recirculation flow rate: | 0.44 $m^3$/h |

Example 2

Development of Pressure in the Membrane Tank and Its Effect on Permeation During Membrane Aeration Cycle The system described in example 1 was used for a membrane tank pressurization test. A pressure sensor was installed onto the bottom of the membrane tank 16. The sensor read 15.3 kPag when the membrane air was on and 11.9 kpag when the membrane air was off. The permeate flow rate when the air was on was 127 L/h, and 86.3 L/h when the air was off.

Example 3

Demonstration of Recycle of Mixed Liquor from Aerobic to Anoxic Tank Through Membrane Tank For a period of about 10 days during the test of example 1, the recycle flow rates were measured and average values calculated. With the mixed liquid level in the anoxic tank 12 set at 1.5 meters above the bottom of the membrane tank, recycle of mixed liquor from the aerobic tank to the anoxic tank via the membrane tank was visually confirmed. A magnetic flow meter installed on the aerobic line 28 recorded an average flow rate of 0.44 $m^3/h$, at a total air flow rate of 8.5 $m^3/h$. This recirculation flow rate was 8.8 times the average permeate flow rate.

Example 4

Aerator Cleaning Using Process Air

Figure 4:
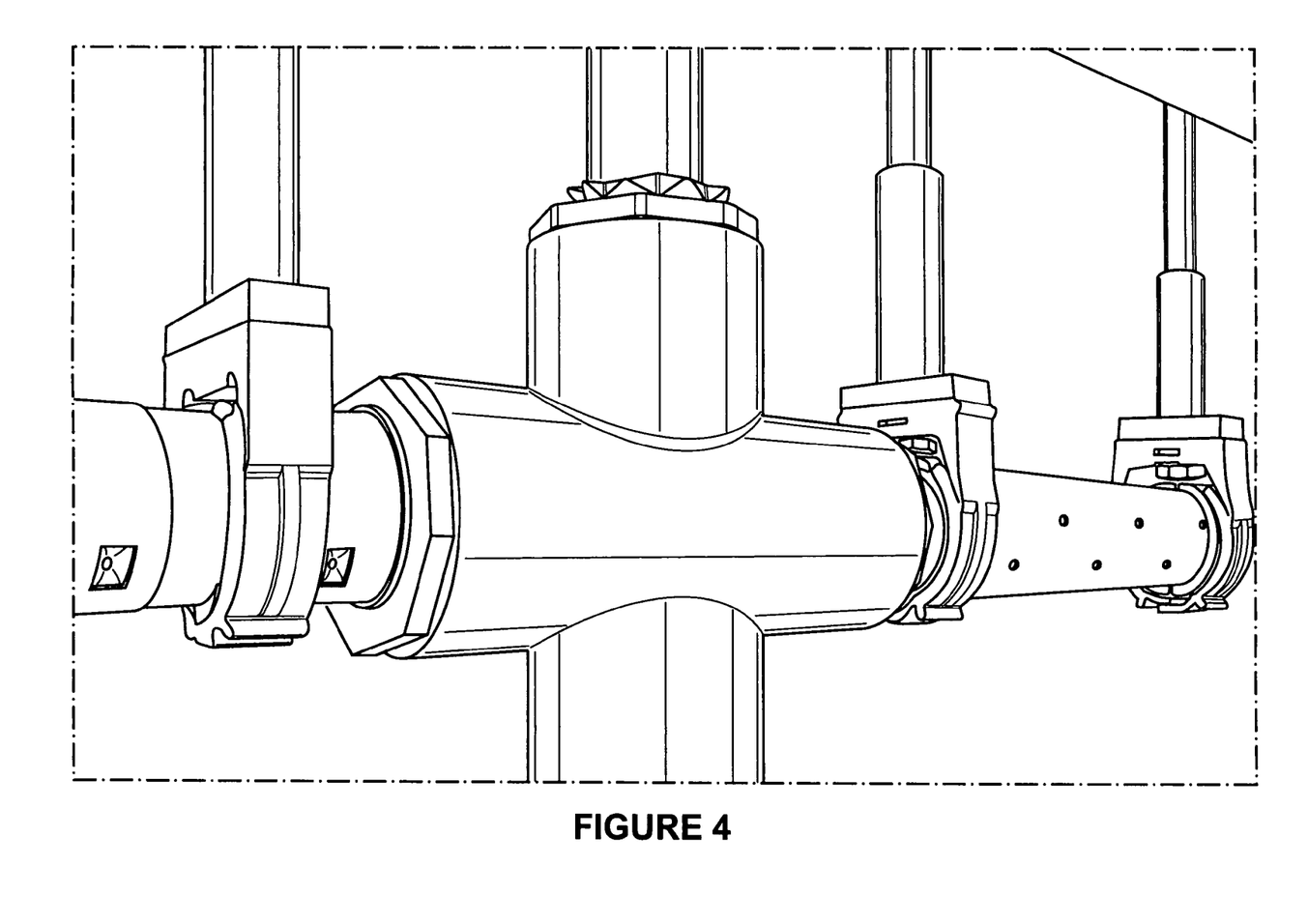
FIG. 4 is a photograph of an aerator/inlet after a period of use.

FIG. 4 shows the process aerator after running in a reactor for five weeks of continuous operation in sludge at 12–15 g/L Mixed Liquor Suspended Solids (MLSS) concentration. The process aerator/inlet screen was maintained in a sludge free state. All holes are fully open and there is no sign of accumulation of sludge inside the aerator.

We claim:

1. A wastewater treatment system comprising,
   a) a first tank or zone;
   b) a second tank or zone separated from the first tank or zone by baffles, walls, or shrouding;
   c) one or more aerators located in the first tank or zone;
   d) an air supply, wherein the air supply is adapted to provide at least a higher flow rate of air and a lower flow rate of air;
   e) an air line which provides a path for air from the air supply to the one or more aerators; and,
   f) a conduit for transferring mixed liquor from the first tank or zone to the second tank or zone;
   wherein each of the one or more aerators comprises,
   i) an aerator body with holes for releasing bubbles from the aerator body or for allowing mixed liquor surrounding the aerator to enter the aerator body;
   ii) an inlet for air to enter the aerator body connected to the air line; and
   iii) an outlet for mixed liquor to exit the aerator body, the outlet connected to the conduit.

2. The wastewater treatment system of claim 1 wherein the air supply provides an airflow sufficient to create bubbles from at least some of the holes at some times and which allows mixed liquor to flow into the holes during at least some of the times.

* * * * *